United States Patent [19]

Gamba

[11] 4,179,943

[45] Dec. 25, 1979

[54] MECHANICAL TORQUE CONVERTER

[76] Inventor: Vittorio Gamba, Calle Amboto, 5-4°B Algorta,, Vizcaya, Spain

[21] Appl. No.: 803,165

[22] Filed: Jun. 3, 1977

[30] Foreign Application Priority Data

Sep. 30, 1976 [IT] Italy ................. 27833 A/76

[51] Int. Cl.² .......................................... F16H 33/02
[52] U.S. Cl. ....................................................... 74/64
[58] Field of Search .............................. 74/64, 68, 69

[56] References Cited

U.S. PATENT DOCUMENTS

| 1,350,106 | 8/1920 | Martinoicz | 74/64 |
| 1,791,386 | 2/1931 | Sprigg | 74/64 |
| 1,834,689 | 12/1931 | Democratis | 74/64 |
| 3,581,584 | 6/1971 | Williams | 74/64 |

FOREIGN PATENT DOCUMENTS 152966 12/1921 United Kingdom ................. 74/64

*Primary Examiner*—William H. Schultz
*Attorney, Agent, or Firm*—Young & Thompson

[57] ABSTRACT

A mechanical torque converter of kinetic-inertial operation, comprising: an input shaft to which a torque is applied; at least one idly rotating mass; means driven by the inlet shaft and adapted to impress on said mass a special periodic rotary motion, means to which said mass transmits the reactions consequent on its motion; and an output shaft on which said means generate a torque, the intensity of which varies in inverse proportion to the instantaneous angular acceleration of the mass, and to the speed of rotation of said outlet shaft.

19 Claims, 18 Drawing Figures

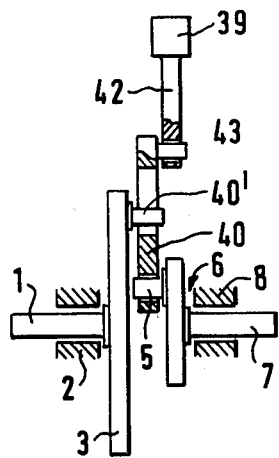 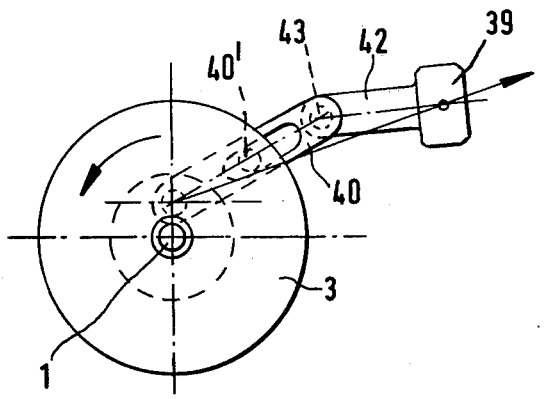
FIG.15.    FIG.16.
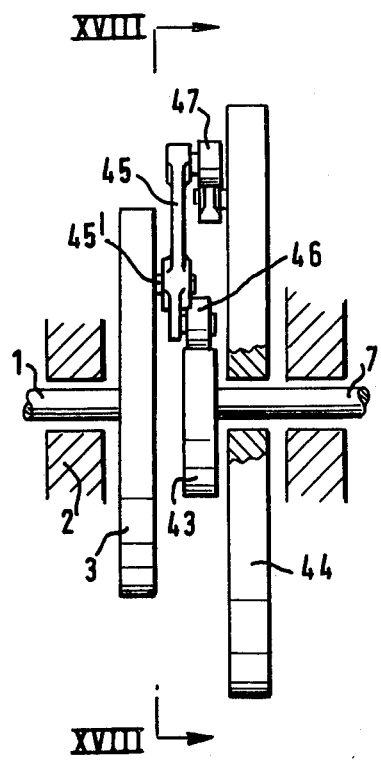 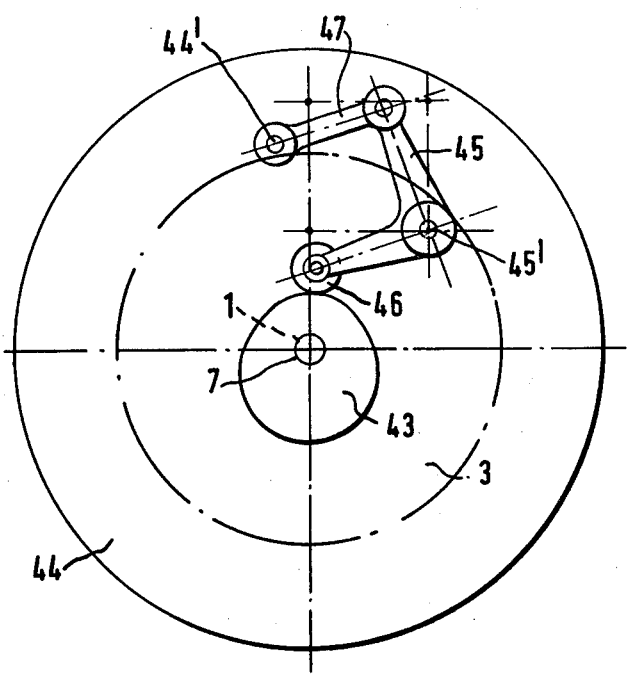
FIG.17.    FIG.18.

MECHANICAL TORQUE CONVERTER

BACKGROUND OF THE INVENTION

This invention relates to a mechanical torque converter of kinetic-inertial operation.

The present invention is based on the observation that by giving a rotating mass a periodic motion, the period of which comprises a first acceleration stage and a second deceleration stage, in which the variations in the speed of said mass during the first quarter of the period are less than those during the last quarter, while the variations in the speed of said mass during the second quarter of the period are greater than those during the third, reactions are generated at the axis of rotation of the rotating mass which tend to displace said axis. If this latter coincides with the pin of a crank, the journal of which is coaxial with a shaft (input shaft) to which a torque is applied to impress said motion on the mass, said reactions cause the crank to rotate such that a torque is generated on its journal (output shaft). The intensity of this torque varies in inverse proportion to the period of the rotary motion of the rotating mass, and to the speed of rotation of the journal.

SUMMARY OF THE INVENTION

Starting from this observation, a mechanical torque converter has been conceived characterised by:
an input shaft to which a torque is applied;
at least one idly rotating mass;
means driven by the input shaft and adapted to impress on said mass a periodic rotary motion in which the speed variations in the first quarter of the period are less than those in the last quarter, while the speed variations in the second quarter of the period are greater than those in the third;
means to which said mass transmits the reactions consequent on its motion;
and an output shaft on which said means generate a torque, the intensity of which varies in inverse proportion to the period of said periodic rotary motion of the mass, and to the speed of rotation of said output shaft.

Preferably, a plurality of similar rotating masses are provided, idly mounted on the same axle, and on which said means driven by the input shaft impress the same rotary motion, with equal mutual displacements of phase.

The converter may comprise many embodiments, all falling within the scope of the present invention. In particular, converters may be conceived in which:
said rotating mass is idly mounted on the pin of a crank, the journal of which constitutes the output shaft of the converter, and said means driven by the input shaft are constituted by a radial mechanical member, rotatably connecting the input shaft to the rotating mass and comprising at least one resilient element yieldable both ways in a direction perpendicular to said member;
said rotating mass is idly mounted on the pin of a crank, the journal of which constitutes the output shaft of the converter, and said means driven by the input shaft are constituted by a centrifugal mass connected by an oscillating shank to the periphery of a plate keyed on said input shaft, an intermediate point of said shank being articulatedly connected to an internal point of said rotating mass;
said rotating mass comprises a plurality of rigid bodies connected by oscillating shanks to the periphery of a disc idly mounted on the output shaft of the converter, and said means driven by the input shaft comprise a double slider idly mounted on the pin of a crank, the journal of which constitutes the output shaft of the converter, and engaged at one end with a peg emerging axially from the periphery of a plate keyed on the input shaft, and at its other end with a peg emerging axially from the periphery of said disc carrying the rigid bodies;
said rotating mass comprises at least one rigid body oscillating about the end of an arm, which is idly mounted at its other end on the pin of a crank the journal of which constitutes the output shaft, and said means driven by the input shaft comprise a peg emerging axially from the periphery of a plate keyed on to the input shaft, and a slot in said arm to receive said peg;
said rotating mass consists of a disc idly mounted on the output shaft of the converter, and said means driven by the input shaft are constituted by a toggle-joint lever pivoted on a peg emerging axially from a plate keyed on the input shaft and having one end connected to said disc by a connecting rod and the other end engaged via an idle roller with a cam keyed on the output shaft.

According to the invention, and depending on the type of converter of the various types heretofore defined,
said means to which the rotating mass transmits the reactions consequent on its periodic motion to generate a torque on the output shaft are constituted by the crank, the journal of which constitutes the output shaft and the pin of which forms the axle on which the mass rotates; or:
said means to which the rotating mass transmits the reactions consequent on its periodic motion to generate a torque on the output shaft, are constituted by an idle disc to which the rigid bodies forming the rotating mass are connected, by a double slider, by the peg of said disc engaged in the slider, and by the crank the journal of which constitutes the output shaft and the pin of which forms the axle on which the slider rotates; or:
said means to which the rotating mass transmits the reactions consequent on its periodic motion to generate a torque on the output shaft, are constituted by an assembly comprising the toggle-joint lever and connecting rod interposed between the input shaft and a disc constituting the rotating mass, and by cam keyed on the output shaft and on which the end roller of the toggle-joint lever engages.

BRIEF DESCRIPTION OF THE DRAWINGS

The invention is described hereinafter in greater detail by way of example with reference to the accompanying drawings, which illustrate various embodiments of the types indicated heretofore, and some modifications thereof, and in which:

FIG. 1 is an axial section through a diagrammatic representation of a first embodiment of the invention, of which

FIG. 3, FIG. 5 and FIG. 7 are three modifications of a second embodiment of the invention, shown in axial section and of which

FIG. 9 and FIG. 11 are two modifications, shown in axial section, of a third embodiment of the invention of which

FIG. 13 and FIG. 15 are diagrammatic axial sections through two modifications of a further embodiment of the invention, of which FIG. 14 and FIG. 16 are front views on the input side; and FIG. 17 and FIG. 18 are an axial section and a cross-section through a further embodiment of the invention, again shown diagrammatically.

DESCRIPTION OF THE PREFERRED EMBODIMENTS

Figure 1:
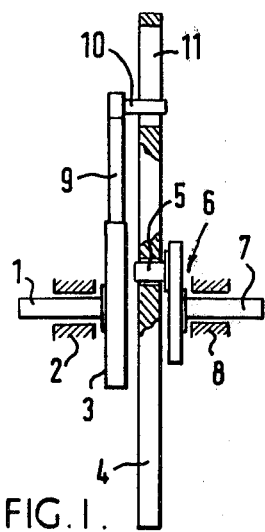

Consideration will first be given to the embodiment of the mechanism according to the present invention shown in FIGS. 1 and 2 of the drawings. This mechanism comprises: an input shaft 1, mounted to rotate freely in a bearing 2 and terminating in a plate 3 applied to that end of it which is internal to the device; a rotating mass constituted by a heavy disc 4 idly mounted at its centre on the pin 5 of a crank 6, the journal of which constitutes the output shaft 7 of the device and rotates in bearings 8; and a resilient arm 9, in the form of a leaf spring, mounted radially projecting from the plate 3 of the input shaft 1, and from the outer end of which there emerges axially a peg 10 which engages in a radial slot 11 in the disc 4. It is assumed that a drive moment is applied to the input shaft 1 and a resisting moment to the output shaft 7. The mass of the disc 4 is assumed to be uniformly distributed.

In the absence of friction, of resistance and of other secondary phenomena, such as manifestations of a vibratory, torsional or other character, the rotation of the shaft 1 produced by the drive moment applied thereto causes the arm 9 to rotate the disc 4 about its axis, i.e. about the crankpin 5. The motion of the disc 4 is a periodic motion in which, because of the resilience of the arm 9 and inertia of the disc 4 and the consequent lags and leads produced in transmitting the motion from the shaft 1 to the disc 4, the speed variations, that is, the variations in the angular velocity, during the first quarter of the cycle of rotation are less than those during the last quarter, while the speed variations during the second quarter of the cycle of rotation are greater than those during the third. This generates reactions at the crankpin 5 on which the disc 4 freely rotates which cause the crank 6 to rotate about its journal 7 and consequently cause the device output shaft, constituted by the said journal 7, to rotate in the same direction as the input shaft. The torque which arises in this manner on the shaft 7 is adapted to balance a resisting moment applied to the output of the mechanism when a drive moment is applied to its input. The intensity of this torque is inversely proportional to the instantaneous angular velocity of the mass constituted by the disc 4, and to the speed of rotation of the output shaft 7.

The mechanism is therefore adapted to constitute a mechanical torque converter, able to advantageously replace present gearboxes and to permit continuous speed variation as a function of the resisting moment, to which the output torque of the device adjusts automatically.

It is easy to imagine that with a simple mechanism such as that heretofore illustrated and described, the rotary motion of the output shaft is highly variable and can be negatively influenced by the conditions under which the device is used and loaded. It is therefore evident that in practice a certain number of rotating masses or discs such as 4 should be provided, all idle on the same axis, and with the same periodic rotary motion, with equal mutual displacements of phase, being impressed upon them by means driven by the input shaft. In this manner, it is possible to regulate the motion of the crank 6, and consequently of the outlet shaft 7, in a way which is acceptable from the practical utilisation aspect.

Figure 2:
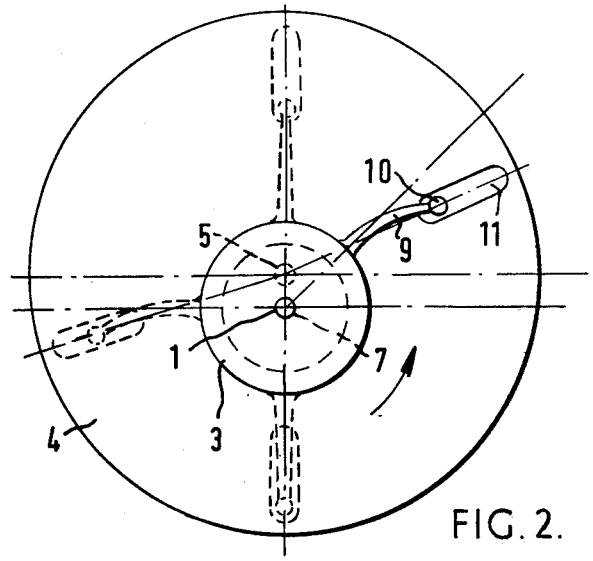
FIG. 2 is a front view on the input side.

The same results obtained by the device shown in FIGS. 1 and 2 and heretofore described may be attained by other embodiments of the device, and all representing an expression of the same inventive idea. Some of these embodiments which at the present time seem particularly interesting or significant, are described briefly hereinafter with reference to the accompanying drawings.

Figure 3:
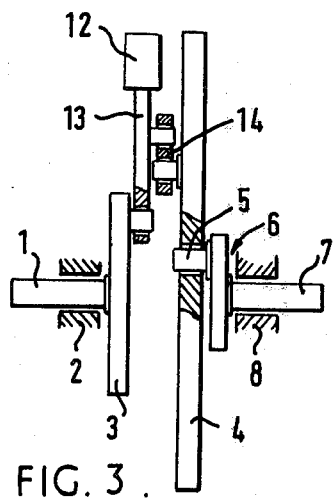
Figure 4:
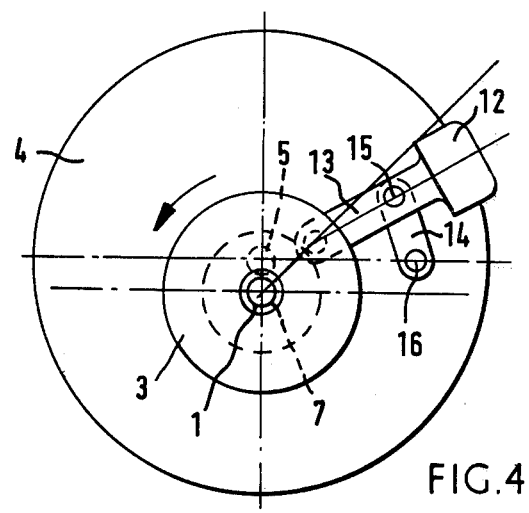
FIG. 4, FIG. 6 and FIG. 8 are front views on the input side.

The device shown in FIGS. 3 and 4 comprises an input shaft 1 rotatably mounted in bearings 2 and terminating in a plate 3, and a rotating mass 4 in the form of a disc mounted idly on the pin 5 of a crank 6, the journal of which forms the output shaft 7 of the device, all as described in the case of the device of FIGS. 1 and 2. However the means by which the main shaft 1 impresses rotation on the disc 4 are different. These means are now constituted by a centrifugal mass 12 connected to the plate 3 by a rigid shank 13 pivoted to the periphery of said plate, and by a connecting rod 14 the ends of which are pivoted respectively to an intermediate point 15 on the shank 13 and to an internal point 16 on the disc 4.

This system also introduces lags and leads in the motions of the input and output shafts relative to each other, when compared with a rigid transmission, in transmitting the rotational motion from the plate 3 to the disc 4, and consequently the same mechanism operating conditions are obtained as already described for the embodiment of FIGS. 1 and 2. Thus in the embodiment shown in FIGS. 3 and 4, there are lags and leads which vary with the centrifugal force developed by the mass 12 and consequently dependent on the speed of the input shaft 1 to which the drive moment is applied.

Figure 5:
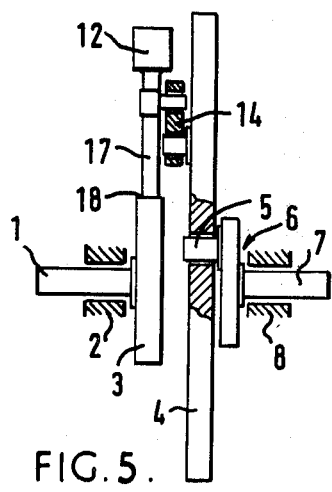
Figure 6:
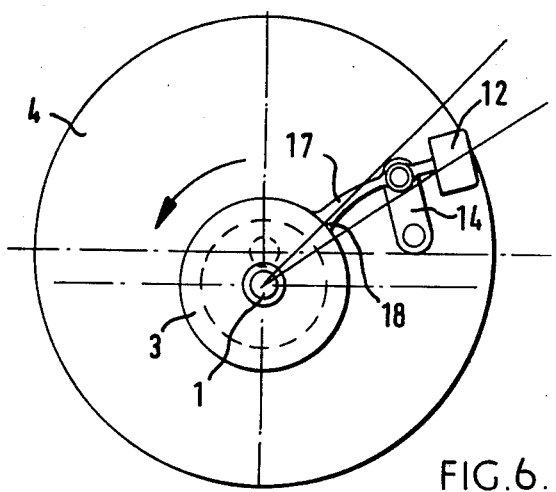
Figure 7:
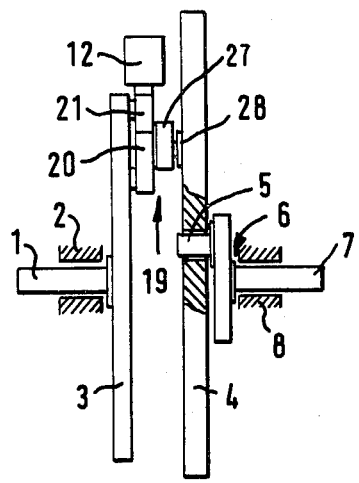
Figure 8:
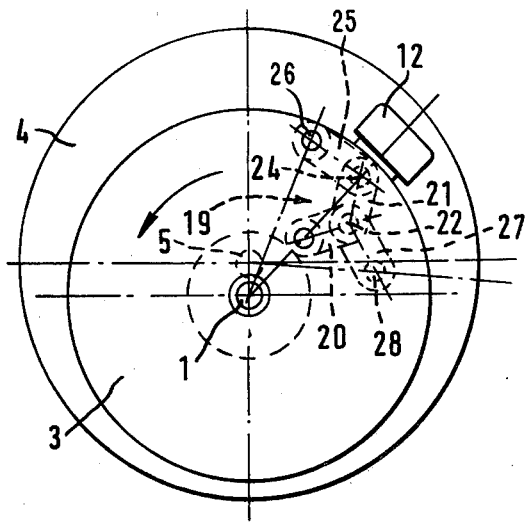

Two modifications of the device of FIGS. 3 and 4 are shown in FIGS. 5 to 8. In the device of FIGS. 5 and 6, the centrifugal mass 12 is connected to the plate 3 by a resilient shank 17 fixed at 18 to the periphery of the plate 3. In the device of FIGS. 7 and 8, the centrifugal mass 12 is connected to the plate 3 by a multiple connecting rod assembly 19. This connecting rod assembly comprises a connecting rod 20 pivoted relatively close to the centre of the plate 3, a connecting rod 21 pivoted to the former at 22 and to the mass 12 at 24, a connecting rod 25 pivoted at 24 to the mass and to the previous connecting rod and at 26 to the periphery of the plate 3, in an angular position displaced in phase from the pivoting position of the connecting rod 20, and a connecting rod 27 pivoted at 22 to the first two connecting rods and at 28 to the disc 4.

Figure 9:
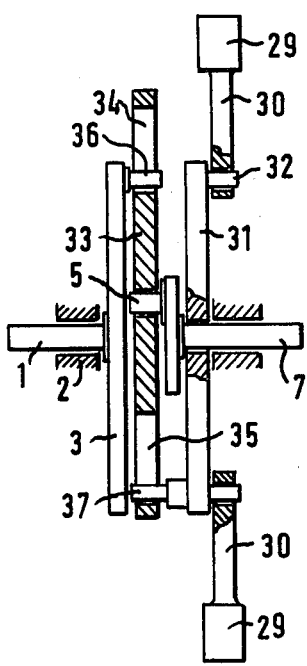
Figure 10:
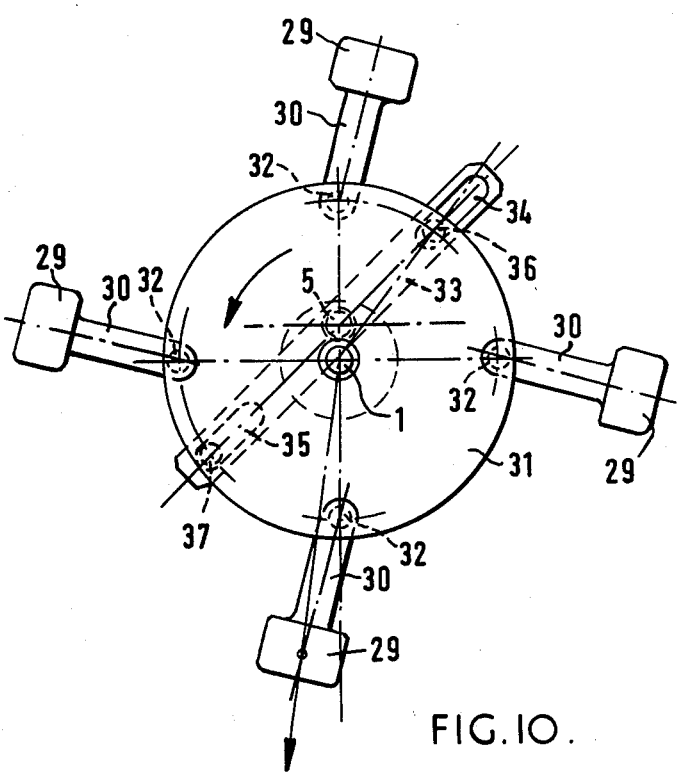
FIG. 10 and FIG. 12 are front views on the input side.

The embodiment of the mechanism according to the invention shown in FIGS. 9 and 10 is different. This device still comprises an input shaft 1 with an end plate 3 and mounted rotatably on a bearing 2, and a crank 6 with its pin 5 and a journal 7 coinciding with the output shaft, but in this case the rotating mass consists of a plurality of bodies 29 connected by rigid shanks 30 to the periphery of a disc 31 on which said shanks are pivoted at 32. The disc 31 is mounted rotatable about the shaft 7. Rotation of the bodies 29 is obtained by a double slider 33, idly mounted at its centre on the crankpin 5 and with the two slots 34 and 35 at its periphery engaged respectively by a peg 36 emerging axially from the plate 3 and a peg 37 emerging axially from the mass support disc 31. It is easily observed that, again with this arrangement the reaction consequent on the periodic motion imposed on the assembly of masses 29, by the rotation of the shaft 1, acts on the crankpin 5 to cause rotation of the shaft 7.

Figure 11:
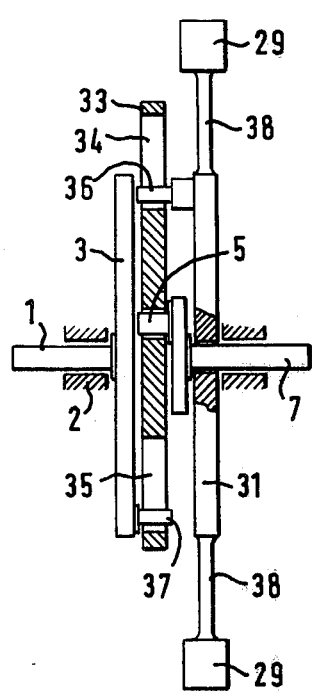
Figure 12:
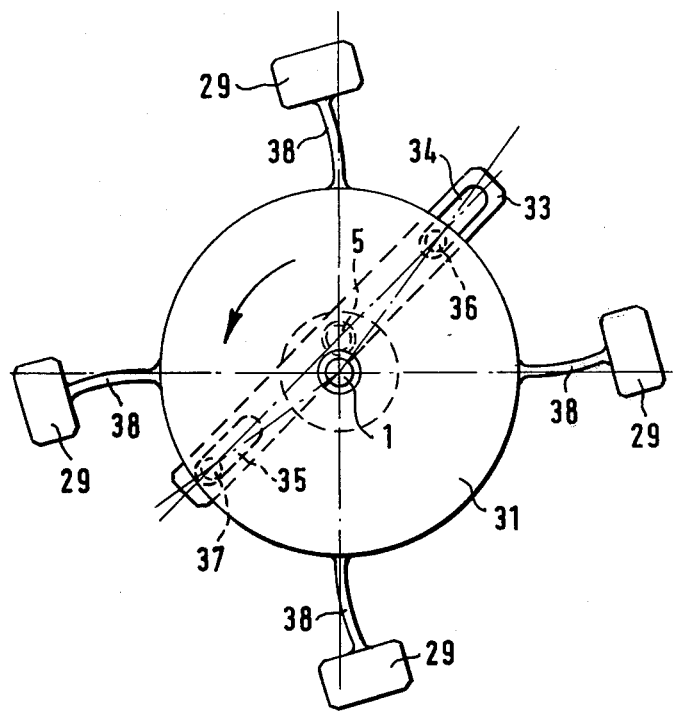

A modification of the mechanism of FIGS. 9 and 10 is represented by the device of FIGS. 11 and 12, in which the masses 29 are connected to the disc 31 by flexible resilient shanks 38 fixed to the periphery of the disc and to the masses.

Figure 13:
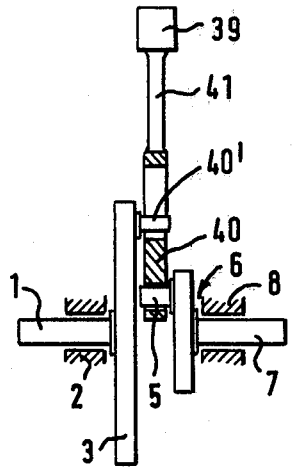
Figure 14:
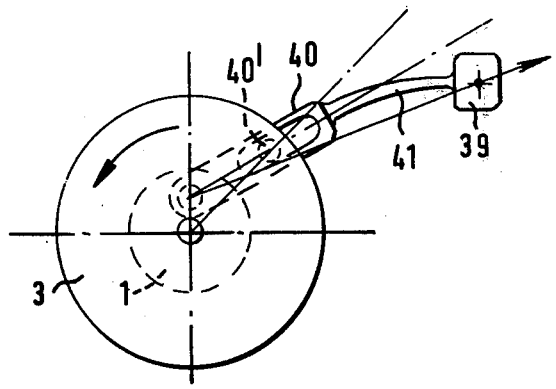

A further embodiment of the mechanism according to the invention is shown in FIGS. 13 and 14. This mechanism comprises a rotating mass 39, fixed to oscillate at the end of an arm 40 mounted idly at its other end on the crankpin 5. The arm 40 is rotated by the peg 40' of the plate 3 of the input shaft 1, while, as in the other cases, the output shaft 7 coincides with the crank journal 6. To make the mass 39 oscillate about the arm 40, the device of these figures uses a yieldable resilient shank 41, fixed at one end to the mass 39 and at its other end to the end of the arm 40. However, other systems may be provided. FIGS. 15 and 16 show a modification of the device in which the mass 39 is connected to the arm 40 by a rigid shank 42 extending from the mass and pivoted at 43 to the end of the arm 40.

In the embodiments of FIGS. 13 to 16, a plurality of oscillating masses should be provided, each with its own arm pivoted to the crankpin 5 and driven by a corresponding plurality of pegs from the plate 3, mutually phase displaced by an equal amount.

Finally, FIGS. 17 and 18 show an embodiment of the mechanism according to the invention, which is diagrammatically more elaborate.

This device again comprises an input shaft 1 mounted rotatably on bearings 2 and terminating in an end plate 3, and an output shaft 7. However, this latter is not the journal of a crank, but of a cam 43. The device still comprises a rotating mass, consisting of a disc 44 idly mounted on the shaft 7. As is evident from the drawing, a toggle-joint lever 45 is idly pivoted at 45' on the plate 3, one of its ends comprising a roller 46 engaged with the periphery of the cam 43, while its other end is articulatedly connected to a connecting rod 47 the other end of which is pivoted to the disc 44 at 44'. In this arrangement, the shaft 1 again transmits to the disc 44 a movement in the form of a periodic rotation, the reactions consequent on which being transmitted by the interconnecting lever system 45, 46, 47 to the cam 43, to cause the shaft 7 to rotate. The law governing the rotation of the shaft 7 may in this case be varied or modified by altering the design of the cam 43 and the design and dimensions of the other elements. Even though not shown, the engagement between the roller 46 and cam 43 must be made continuous, which may be obtained by a spring or by a positive system, this latter giving better results. Again, in this embodiment a plurality of rotating discs such as 44 should be provided, all idle on the axle 7 and provided with interconnecting lever systems such as 45, 46, 47, equally mutually phase displaced and all acting on the cam 43.

I claim:

1. A mechanical torque converter of kinetic-inertial operation, comprising:
   an input shaft to which a torque is applied;
   at least one idly rotating mass; means driven by the input shaft and adapted to impress on said mass a periodic rotary motion in which the speed variations in the first quarter of the period of rotation are less than those in the last quarter, while the speed variations in the second quarter of the period of rotation are greater than those in the third;
   means to which said mass transmits the reactions consequent on its motion; and
   an output shaft on which the last-named means generate a torque, the intensity of which varies in inverse proportion to the instantaneous angular acceleration of the mass, and to the speed of rotation of said output shaft.

2. A torque converter as claimed in claim 1, comprising plural rotating masses mounted idly on the same axle, and on which said means driven by the input shaft impress the same periodic rotary motion, with equal mutual displacements of phase.

3. A torque converter as claimed in claim 1, wherein said rotating mass is idly mounted on the pin of a crank, the journal of which constitutes the output shaft of the converter, and said means driven by the input shaft are constituted by a radial mechanical member, rotatably connecting the input shaft to the rotating mass and comprising at least one resilient element yieldable both ways in a direction perpendicular to said member.

4. A torque converter as claimed in claim 3, wherein said rotating mass is a disc.

5. A torque converter as claimed in claim 1, wherein said rotating mass is idly mounted on the pin of a crank, the journal of which constitutes the output shaft of the converter, and said means driven by the input shaft are constituted by a centrifugal mass connected by an oscillating shank to the periphery of a plate keyed on said input shaft, an intermediate point of said shank being articulatedly connected to an internal point of said rotating mass.

6. A torque converter as claimed in claim 5, wherein said rotating mass is a disc, said centrifugal mass is a rigid body and said shank is a rigid rod pivoted to the periphery of said plate.

7. A torque converter as claimed in claim 5, wherein said rotating mass is a disc, said centrifugal mass is a rigid body and said shank is a resilient rod fixed to the periphery of said plate.

8. A torque converter as claimed in claim 5, wherein said rotating mass is a disc, said centrifugal mass is a rigid body and said shank is a multiple connecting rod assembly, connected at at least two points on said plate, which do not coincide radially and/or circumferentially.

9. A torque converter as claimed in claim 1, wherein said rotating mass comprises a plurality of rigid bodies connected by oscillating shanks to the periphery of a disc idly mounted on the output shaft of the converter, and said means driven by the input shaft comprise a double slider idly mounted on the pin of a crank, the journal of which constitutes the output shaft of the converter, and engaged at one end with a peg emerging axially from the periphery of a plate keyed on the input shaft, and at its other end with a peg emerging axially from the periphery of said disc carrying the rigid bodies.

10. A torque converter as claimed in claim 9, wherein the shanks of said bodies are rigid and are pivoted to the periphery of the disc about axes extending axially of the disc.

11. A torque converter as claimed in claim 9, wherein the shanks of said bodies are resilient and are fixed to the periphery of the disc.

12. A torque converter as claimed in claim 1, wherein said rotating mass comprises at least one rigid body oscillating about the end of an arm, which is idly mounted at its other end on the pin of a crank the journal of which constitutes the output shaft, and said means driven by the input shaft comprise a peg emerging axially from the periphery of a plate keyed on the input shaft, and a slot in said arm to receive said peg.

13. A torque converter as claimed in claim 12, comprising a plurality of said rigid oscillating bodies, each with its own arm.

14. A torque converter as claimed in claim 12, wherein said rigid body is carried by a resilient shank fixed to the end of the arm.

15. A torque converter as claimed in claim 12, wherein said rigid body is carried by a rigid shank pivoted to the end of the arm.

16. A torque converter as claimed in claim 1, wherein said rotating mass consists of a disc idly mounted on the output shaft of the converter, and said means driven by the input shaft are constituted by a toggle-joint lever pivoted on a peg emerging axially from a plate keyed on the input shaft and having one end connected to said disc by a connecting rod and the other end engaged via an idle roller with a cam keyed on the output shaft.

17. A torque converter as claimed in claim 1, wherein said means to which the rotating mass transmits the reactions consequent on its periodic motion to generate a torque on the output shaft are constituted by the crank, the journal of which constitutes the output shaft and the pin of which forms the axle on which the mass rotates.

18. A torque converter as claimed in claim 9, wherein said means to which the rotating mass transmits the reactions consequent on its periodic motion to generate a torque on the output shaft, are constituted by the idle disc to which the rigid bodies forming the rotating mass are connected, by the double slider, by the peg of said disc engaged in the slider, and by the crank, the journal of which constitutes the output shaft and the pin of which forms the axle on which the slider rotates.

19. A torque converter as claimed in claim 16, wherein said means to which the rotating mass transmits the reactions consequent on its periodic motion to generate a torque on the output shaft, are constituted by the assembly comprising the toggle-joint lever and connecting rod interposed between the input shaft and disc constituting the rotating mass, and by the cam keyed on the output shaft and on which the end roller of the toggle-joint lever engages.

* * * * *